US005510083A

United States Patent [19]

Sack et al.

[11] Patent Number: 5,510,083

[45] Date of Patent: Apr. 23, 1996

[54] PIPETTING AID

[75] Inventors: Helmut Sack; Michael Breskamp, both of Berlin; Karl-Heinrich Ehinger, Burladingen, all of Germany

[73] Assignee: Deutsch & Neumann GmbH, Berlin, Germany

[21] Appl. No.: 302,661

[22] PCT Filed: Apr. 22, 1993

[86] PCT No.: PCT/DE93/00361

§ 371 Date: Nov. 21, 1994

§ 102(e) Date: Nov. 21, 1994

[87] PCT Pub. No.: WO93/22057

PCT Pub. Date: Nov. 11, 1993

[30] Foreign Application Priority Data

| | | | |
|---|---|---|---|
| Apr. 24, 1992 | [DE] | Germany | 42 14 634.8 |
| Jun. 26, 1992 | [DE] | Germany | 42 21 263.4 |

[51] Int. Cl.$^{6}$ ..... G01N 1/14; B01L 3/00; B01L 3/02

[52] U.S. Cl. ..... 422/100; 422/99; 422/103; 73/864.03; 73/864.11; 249/180; 249/184

[58] Field of Search ..... 73/864.03, 864.11, 73/864.15; 141/21–26, 29; 222/212, 213, 206, 215; 422/99, 100, 103; 137/853; 417/479; 249/63, 180, 184

[56] References Cited

U.S. PATENT DOCUMENTS

| | | | |
|---|---|---|---|
| 56,596 | 7/1866 | Naglee | 73/864.15 |
| 451,179 | 4/1891 | Wave | 417/479 |
| 1,326,445 | 12/1919 | Fewlass | 137/853 X |
| 1,422,778 | 7/1922 | Petcher | 141/24 |
| 1,998,901 | 4/1935 | Massa | 141/24 |
| 2,540,360 | 2/1951 | Ulvild | 73/864.15 |
| 2,728,232 | 12/1955 | Bremmer | 73/864.15 |
| 2,795,245 | 6/1957 | Meehan | 141/26 |
| 3,219,417 | 11/1965 | Klingbeil et al. | 422/100 X |
| 3,461,868 | 8/1969 | Palich | 222/215 X |
| 3,849,053 | 11/1974 | Bruce et al. | 249/63 X |
| 3,856,256 | 12/1974 | Celesti | 249/184 X |
| 4,297,153 | 10/1981 | Erickson et al. | 249/184 X |
| 4,850,955 | 7/1989 | Newkirk | 604/9 |
| 4,913,642 | 4/1990 | Weber | 249/184 X |
| 5,238,244 | 8/1993 | Cotter et al. | 417/479 X |

FOREIGN PATENT DOCUMENTS

| | | | |
|---|---|---|---|
| 255975 | 2/1961 | Australia | 417/479 |
| 169466 | 5/1977 | Czech Rep. . | |
| 897930 | 11/1953 | Germany . | |
| 838240 | 6/1981 | U.S.S.R. | 137/853 |

OTHER PUBLICATIONS

M. Vanka *Chem. Listy* 1980, 74, 308–309.

*Primary Examiner*—Jill Warden
*Assistant Examiner*—Arlen Soderquist
*Attorney, Agent, or Firm*—Jack Schuman

[57] ABSTRACT

The invention relates to a pipetting aid for exerting suction on liquids. The usual previous "Peleusball" has disadvantages when handling and with regard to washing out. The object of the invention is to create a pipetting aid through constructive change, which is functionally safe and easy to handle and which at the same time allows uncomplicated cleaning of the inside. The new pipetting aid according to the invention consists of an elastic hollow body (1) with a larger ball-like central body (2), at which a first tubular attachment (3) and a second tubular attachment (4) is located, a third tubular attachment (5) leaving the said second tubular attachment (4) at an angle, and is characterized in that in the first tubular attachment (3) an easily removable check valve with particular constructive design is disposed as a first closure component (6), the valve, when the ball-like central body (2) is squeezed, allowing, without additional actuation, the compressed air from the inside of the hollow body into the outer atmosphere, but not vice versa, and at the same time the second and third closure component (7) and (8) in the corresponding attachment (4) and (5) adopting a position which prevents air from passing from the inside to the outside. A production process is also described.

11 Claims, 2 Drawing Sheets

PIPETTING AID

The invention relates to a pipetting aid for exerting suction on and emptying of liquids in pipettes and a production process for this pipetting aid.

A multitude of pipettes are known from the prior art, which exert suction on liquids and squeeze them out by means of a piston mechanism. Only a few technical solutions however are known for pipettes which are still frequently used in laboratories as simple, cheap and easy to handle measuring devices and in which the exertion of suction is carried out by mouth or with a rubber ball (the pipetting aid), which can be deaerated.

A suction cylinder for exerting suction on liquids in pipettes is described in DE-A-2155239, the said cylinder surrounding the end of the pipette, without valves being provided for it. A practical transposition of this suggestion is not known.

DE-A-3016594 describes a tubular pipette of fixed shape with a suction aid, the suction aid consisting of an elastic, balloon-like container part, which has a suction opening and an aeration opening lying opposite one another. The elastic and the container part of fixed shape can be fused together and consequently form a pipette with a joined suction part. The closure components for the elastic container part are not specified.

The German Utility Model GM 8333458 protects a pipetting aid for capillary pipettes, said pipetting aid consisting of a bellow-like head and a following tube for receiving an adapter for the capillary pipettes. Openings for the entry and exit of air are not provided except via the pipette tip.

A pipetting aid used under the name Peleusball is furthermore known (DE 897 930), which consists of a rubber material with an inlet and outlet each closed by a ball valve in the form of a glass ball disposed in the air passage. A disadvantage of this pipetting aid is that it is difficult to clean after pipetted liquids have entered into sections of the rubber material, and above all the necessity, when the air ball is pressed and likewise when pressing out residues from the pipette, of simultaneously having to actuate the corresponding valve with the fingers. A further disadvantage is the manufacture of at least two moulding parts with the subsequent gluing together (or vulcanization) of the material.

The manufacture of such pipetting aids is mostly effected in the injection moulding process whereby, due to the large balloon-like enlargement of the central body, either the two separately injection moulded halves are glued together or vulcanized subsequently, or a single-piece moulded body is produced in a mould without a core by means of a propellant. With the lastly named process a very irregular surface of the elastic material is produced, which, after pipetted liquids have entered, is difficult to clean.

The object of the invention is to develop a pipetting aid by using a simplified manufacturing process, which is functionally safe and easy to handle and which at the same time allows uncomplicated cleaning of the inner area.

This object is achieved according to the invention by a pipetting aid for exerting suction on liquids, consisting of an elastic hollow body with a larger ball-like central body at which are located a first tubular attachment and a second tubular attachment, from which second tubular attachment a third tubular attachment leaves at an angle, an easily removable check valve as a first closure component being disposed in the first tubular attachment, which, when the ball-like central body is squeezed, allows, without further actuation, the compressed air from inside the hollow body into the outer atmosphere, but not vice versa and at the same time the second and third closure components in the corresponding attachments substantially adopting a position which prevents air from passing from the inside to the outside. When the air is compressed, the check valve therefore adopts a through passage position, whilst having a closed or locked position when only low pressure is in the lower central body.

The check valve is a cylindrical body in which at least one cylinder area is closed over its entire area and the cylindrical body has, in its cylindrical part, at least one outlet or cavity suitable for the passage of air between the cylinder wall and the inner wall of the attachment. The cylindrical body here has a projecting, i.e. somewhat protruding shoulder, which chamfers to the inner side of the cylindrical jacket at the outer side of the lower cylindrical jacket.

The hollow body preferably consists of one single piece of a rubber elastic material. Furthermore, it is preferable that the diameter of the tubular first attachment is in a ratio of 1:2 to 1:4, preferably 1:2.5 to 1:3.5, particularly 1:3.0 to 1:3.4 to the diameter of the ball-like central body.

In a first embodiment the check valve is a substantially rigid cylindrical body in which at least one area is closed over its entire area and which has one or several cavities for the passage of air on the outer side of the cylindrical jacket which is towards the inner wall of the attachment. Through its seat in the elastic first tubular attachment, when the air is compressed in the inner ball-like central body, one or several passages are created between the valve body and the elastic inner wall of the attachment, said inner wall fitting closely in the remaining part. The named cavities can, for example, be disposed as a continuous annular groove in the lower part of the cylinder, thus, for instance, at the ball-like central body attachment, this attachment cooperating with the projecting shoulder of the cylinder.

In a second embodiment, the check valve is a non-elastic cylindrical hollow body, the upper, outward pointing area of which is a closed projecting lid and the hollow body comprising, in its cylindrical jacket, at least one, preferably two continuous bore(s) and the area of the said hollow body in the direction of the ball-shaped enlargement being open. Here, a projecting shoulder is located on the outside of the lower cylindrical jacket, said shoulder running conically to the inner side of the cylindrical jacket.

In order to allow the comfortable inserting and removing of the valve of both embodiments, a small tolerance of −0.3 mm should always be present in the interaction between the valve and the inner side of the first attachment, i.e. an exact press fit should be avoided. In so doing, the valve is held such that, underneath the projecting upper area of its cylindrical jacket, an annular round groove is formed in the cylindrical jacket which contacts the annular round lip disposed at the inner upper edge of the attachment.

Alternatively the valve is held in that the projecting shoulder of the closure component is disposed at a distance from the groove such that, when the lip contacts the groove, the annular surface of the shoulder rests positively at the attachment area of the ball-like central body. In so doing, the attachment area of the central body should have an angle of 90° to the first attachment.

The bore for the second embodiment in the cylindrical jacket is disposed underneath the groove, but above the projecting shoulder, preferably in a section of the closure component nearer the groove. The cylindrical jacket preferably comprises two bores, which are preferably opposite one another.

With the help of this first closure component in the form of a check valve, perfect sealing is possible in the corresponding fitting within the first attachment, and the valve is easy to take out due, for example, to the collar-shaped, enlarged upper part.

In the region where the third attachment runs into the second attachment, a low-volume enlargement of the attachment is provided. This is used to completely squeeze out residual liquids which have remained in the pipette. An enlargement of this kind at the end of the third attachment, as in the prior art, is therefore no longer required. There is also no need, in order to squeeze out residual liquids, to simultaneously actuate the closure component located in the third attachment and this consequently illustrates a further improvement of the invention.

The second and third closure component should in each case be a ball, preferably a glass ball. It is likewise expedient to dispose circular, marked pressure surfaces raised relative to the round tubular attachment, on the outside of the second and third attachment, at the height of the corresponding closure components.

The rubber-elastic material is advantageously a relatively inert material relative to aggressive liquids like acids and bases, which material furthermore comprises a good extensibility and excellent elasticity or fatigue stability.

According to the invention natural rubber is preferred.

Through the special design of the first tubular attachment in relation to the ball-like central body and of the closure component (check valve) disposed in the attachment, the pipetting aid according to the invention makes it possible to easily take out the valve and to simply clean the elastic hollow body, for instance, of liquids or solids (with suspensions). A further advantage is that due to the safety valve used, it is no longer necessary to also simultaneously actuate the valve in the first attachment when the ball-like central body is squeezed, in order to let the air into the outer atmosphere.

A further advantage is seen from the process described in the following. The process according to the invention for manufacturing a pipetting aid from rubber-elastic material, consists in that a thermoplastic moulding material is fed into a two-piece, closed mould in the conventional manner at a high temperature and is cross-linked, a multi-part moulding core, preferably a three-piece moulding core, being disposed inside the mould, the hollow chamber formed by the inner surface of the outer mould and the outer surface of the moulding core corresponding to a hollow body with a ball-like central body, and a first tubular attachment, and a second tubular attachment disposed on the opposite side, from which second tubular attachment a third tubular attachment leaves at an angle, and immediately following the removal from the two-piece mould, the part of the moulding core for the ball-like central body being removed by enlarging the first tubular attachment of the rubber-elastic hollow body, the pipetting aid then being completed by inserting three corresponding closure components into the three attachments.

The hollow body preferably consists of a single piece of a rubber-elastic material in order to avoid additional working cycles which are necessary when putting together multi-piece hollow bodies.

It is furthermore advantageous for the diameter of the tubular first attachment to be in a ratio of 1:2 to 1:4, preferably 1:2.5 to 1:3.5, particularly 1:3.0 to 1:3.4 to the diameter of the ball-like central body. By this means, a problem-free removal from the mould of the moulding core for the ball-like central body is possible by means of the first attachment, said attachment later receiving the safety valve.

The injection moulding process, which allows efficient production of the object of the invention, is particularly suitable as the manufacturing process. The temperatures here are dependent upon the kind of thermoplastic material. In general the temperature lies in the region of 80° C. to 200° C., preferably in the region of 100° to 180° C. Pressure and dwelling time in the mould must also be matched to the corresponding thermoplastic material and lie in the region of professional knowledge. It is therefore also clear that other manufacturing processes like, for example, the "transfer moulding" process can be used.

BRIEF DESCRIPTION OF THE DRAWINGS

The invention is described in more detail in the following by examples. In the corresponding drawing.

EXAMPLE 1

Figure 4:
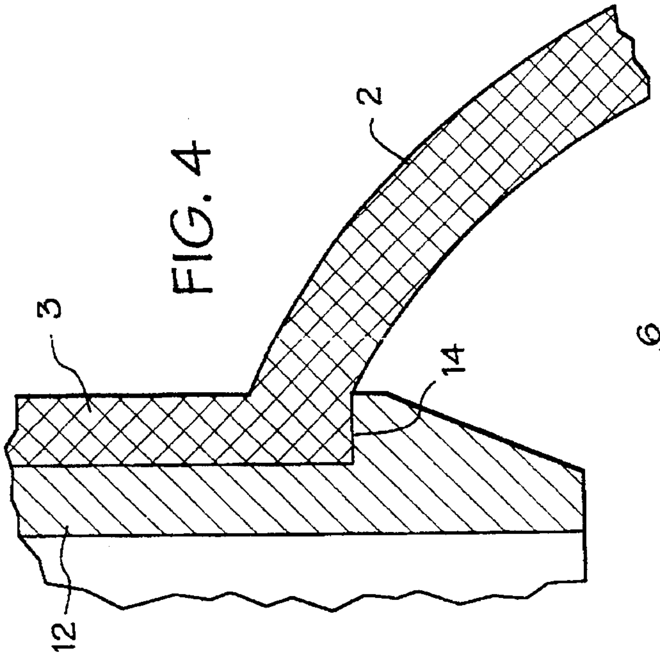
FIG. 4: is a detailed section of the lower end of the safety valve and of the attachment area of the ball-like central body

The pipetting aid for exerting suction on liquids consists of a rubber-elastic hollow body 1 made from natural rubber with a larger ball-like central body 2, at which a first tubular attachment 3 and a second tubular attachment 4 is located. A third tubular attachment 5 leaves at an angle from the second attachment. In the first tubular attachment 3 an easily removable safety valve is disposed as a first closure component 6, which, when the ball-like central body 2 is squeezed, allows, without additional actuation, the compressed air from inside the hollow body into the outer atmosphere, but not vice versa. At the same time, during such actuation, the second and third closure component 7 and 8, which are used here in the form of conventional glass balls, substantially adopt a position which prevents air passing from the inside to the outside in the corresponding attachment 4 and 5. Due to this passage, specified in one direction only, the safety valve allows the vacuum which has occurred in the ball-like central body through squeezing, to be used in the second attachment 4 after actuating the closure component 7, for exerting suction on air or liquid by means of the pipette connected at the outer opening 23 of the attachment 4.

The diameter of the tubular first attachment 3 is in a ratio of 1:3.2 to the diameter of the ball-like central body 2. In the attachment 3, the first closure component 6 is disposed as a safety valve in the form of a non-elastic cylindrical hollow body, the upper, outward pointing area 11 of which is a closed protruding lid and the hollow body comprising in its cylindrical jacket 12 at least one continuous bore 13 and the area 17 being open inside towards the ball-shaped enlargement. According to FIG. 4, there is located at the outer side of the lower cylindrical jacket 12 a projecting shoulder 14 which runs conically to the inner side 15 of the cylindrical jacket 12. By means of this conical shape, the insertion of the valve is facilitated. From FIG. 4 the preferred rectangular attachment area of the central body 2 and its contact with the annular surface of the shoulder 14 can also be seen.

Figure 3:
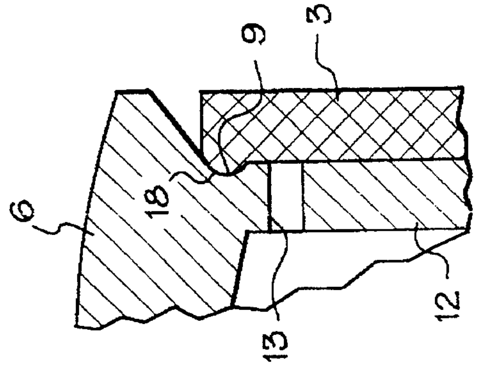
FIG. 3: is a detailed section of the upper end of the first attachment and of the safety valve

As seen from FIG. 3, an annular round groove 18 is formed in the cylindrical jacket 12 of the closure component 6 underneath the projecting upper base 11 in the said jacket. At the inner upper edge of the attachment 3, an annular round lip 9 is disposed which engages the groove 18.

The projecting shoulder 14 of the closure component 6 is disposed at a distance from the groove 18, such that when the lip 9 engages the groove 18, the annular surface of the shoulder 14 rests positively at the attachment area of the ball-like central body 2.

In the embodiment of the closure component 6 with bore, the bore 13 is disposed in the cylindrical jacket 12 closely beneath the groove 18. It can consist of two bores on opposite sides.

In the first embodiment, the closure component 6 is provided with a groove 19. When the ball-like central body 2 is squeezed, this closure component, without additional actuation, by widening the attachment 3, allows the compressed air from inside the hollow body, via the groove 19, along the outer wall of the cylindrical jacket 12 into the outer atmosphere, but not vice versa.

For pipettes not adjusted to drain off, it is necessary to remove the liquid residue through subsequent air pressure by means of the pipetting aid. For this purpose, a low-volume enlargement 10 of the attachment is provided in the area where the third attachment 5 runs into the second attachment 4.

Figure 2:
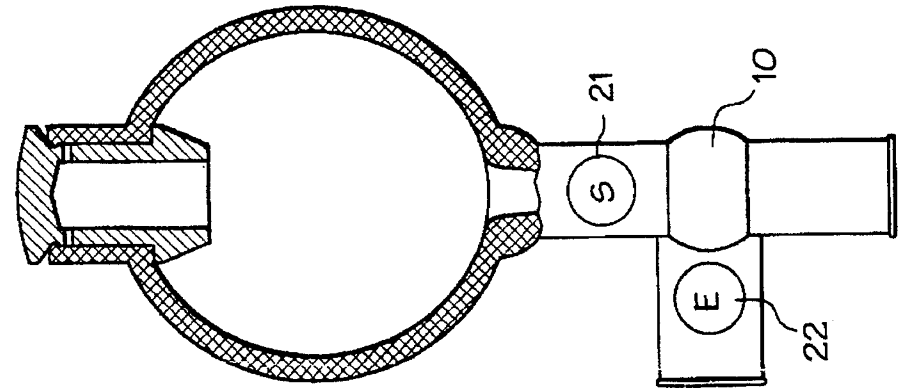
FIG. 2: is a partial section of the hollow body
Figure 1:
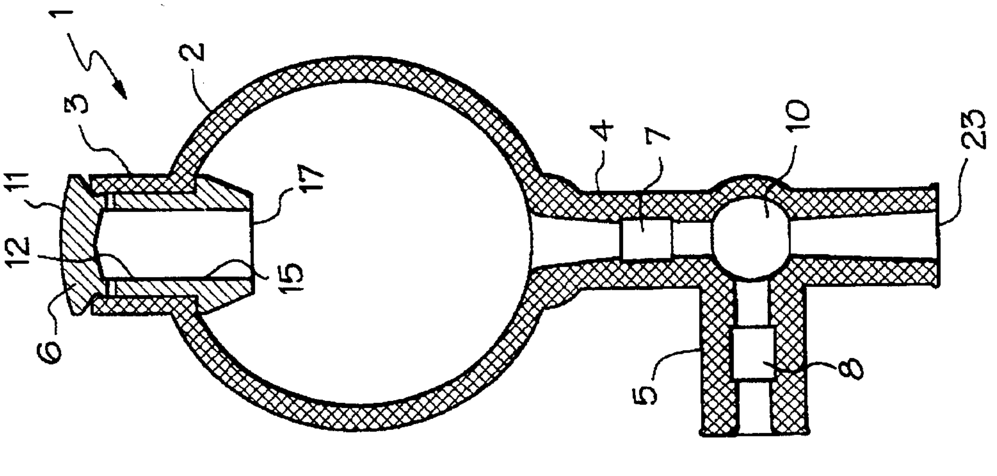
FIG. 1: is a sectional view of the hollow body according to the invention
Figure 5:
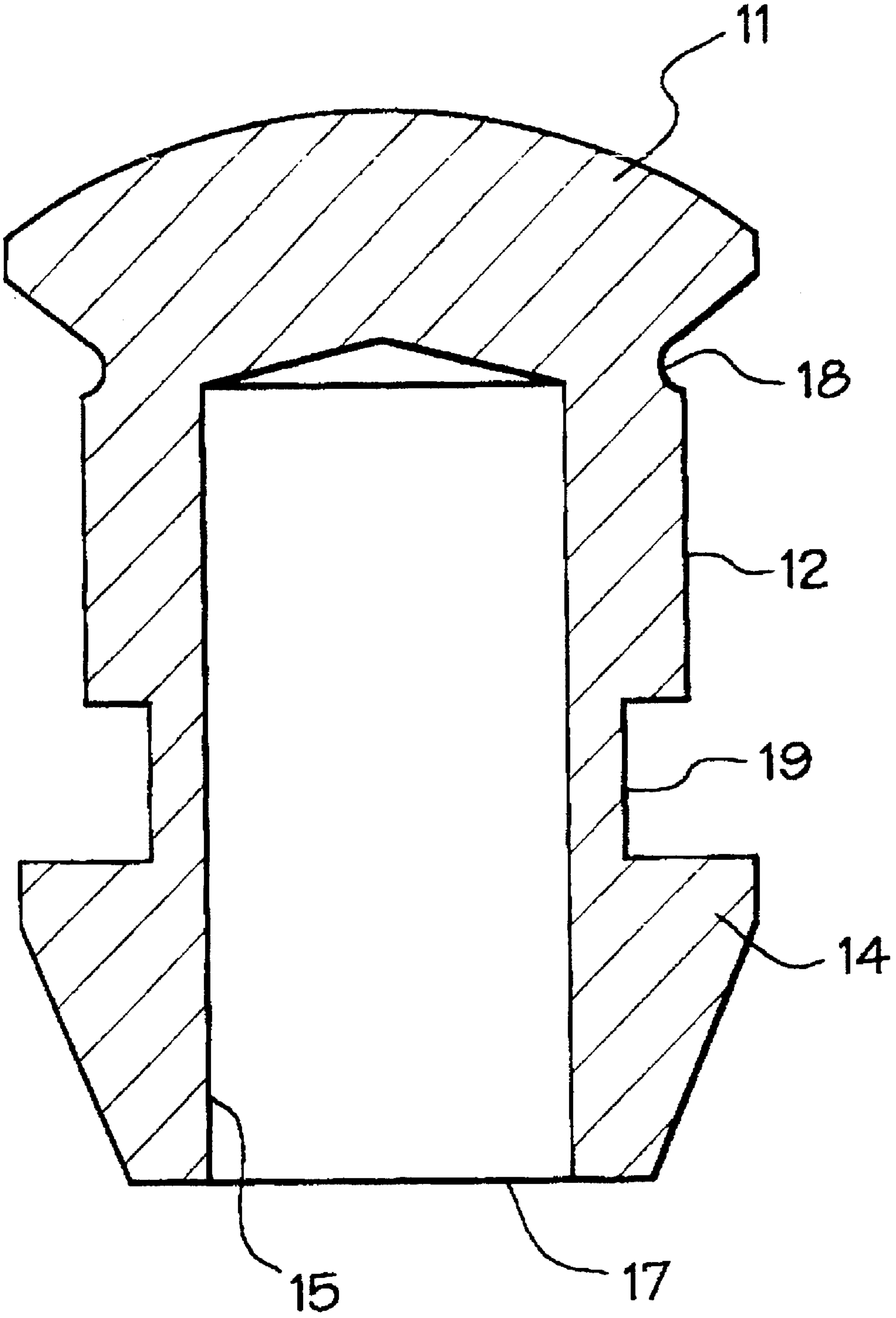
FIG. 5: is a sectional view of the check valve in the first embodiment.

According to FIG. 2, circular, marked pressure surfaces 21, 22 raised relative to the round tubular attachment, are disposed on the outside of the second and third attachment 4, 5 at the height of the corresponding closure component 7, 8. These facilitate the actuation of the closure components 7 and 8.

EXAMPLE 2

The process according to the invention consists in that a material made of natural rubber is injected into a two-piece closed mould by means of the injection moulding process, a three-piece moulding core consisting of the moulding core for the attachment 3 with the ball-like central body 2 and the two moulding cores for the attachment 4 and the attachment 5 being disposed inside the said two-piece closed mould. The temperature here is approximately 150°–160° C. Immediately following the removal from the two-piece mould, the moulding core for the ball-like central body is removed by enlarging the attachment 3 of the single-piece rubber-elastic hollow body. The pipetting aid is then completed by inserting the safety valve and the two glass balls as closure components into the three attachments. The pipetting aid consists of only one single piece and can be used without subsequent work.

We claim:

1. A pipetting aid for exerting suction on liquids, said pipetting aid comprising:

(a) a hollow elastic body (1), (b) a hollow elastic generally ball-shaped portion (2) formed as part of said hollow body (1), the interior of said ball-shaped portion (2) communicating with the interior of said body (1), (c) a first hollow tubular portion (3) connected to said ball-shaped portion (2), the interior of said first tubular portion (3) communicating with the interior of said ball-shaped portion (2), (d) a second hollow tubular portion (4) connected to said ball-shaped portion (2), the interior of said second tubular portion (4) communicating with the interior of said ball-shaped portion (2), (e) a third hollow tubular portion (5) connected at an angle to said second tubular portion (4), the interior of said third tubular portion (5) communicating with the interior of said second tubular portion (4), (f) first check valve means (6) positioned in said first tubular portion (3) and adapted to permit the passage of air from inside said ball-shaped portion (2) to the atmosphere upon compression of said ball-shaped portion (2) and not in the reverse direction, (g) second check valve means (7) positioned in said second tubular portion (4), (h) third check valve means (8) positioned in said third tubular portion (5), (i) said second check valve means (7) and said third check valve means (8) being arranged within said second and third tubular portions (4) and (5) respectively so as to prevent the passage of air from inside said ball-shaped portion (2) to the atmosphere upon compression of said ball-shaped portion (2), (j) said first check valve means being in the form of a hollow cylinder (12), (k) closure means (11) extending across and closing that end of said hollow cylinder (12) remote from said ball-shaped portion (2), (l) air passage means extending into the external periphery of said hollow cylinder (12) to permit the passage of air between the external periphery of said hollow cylinder (12) and the internal periphery of said first tubular portion (3).

2. A pipetting aid as in claim 1, wherein:

(m) said air passage means comprises a bore (13) extending through the wall of said hollow cylinder (12) and communicating between the interior of said hollow cylinder (12) and the internal periphery of said first tubular portion (3).

3. A pipetting aid as in claim 1, wherein:

(m) said air passage means comprises a groove (19) extending around the external periphery of said hollow cylinder (12).

4. A pipetting aid as in claim 1, further comprising:

(m) a conical cross-section provided at that end of said hollow cylinder (12) remote from said closure means (11), said conical cross-section increasing in dimension toward said closure means (11).

5. A pipetting aid as in claim 1, wherein:

(m) said hollow elastic body including said ball-shaped portion (2) and said first, second and third tubular portions (3), (4) and (5) are of unitary one-piece construction.

6. A pipetting aid as in claim 1, wherein:

(m) the ratio of the internal diameter of said first hollow tubular portion (3) to the maximum internal diameter of said ball-shaped portion (2) is in the range of 1:2 to 1:4.

7. A pipetting aid as in claim 1, wherein:

(m) the ratio of the internal diameter of said first hollow tubular portion (3) to the maximum internal diameter of said ball-shaped portion (2) is in the range of 1:2.5 to 1:3.5.

8. A pipetting aid as in claim 1, wherein:

(m) the ratio of the internal diameter of said first hollow tubular portion (3) to the maximum internal diameter of said ball-shaped portion (2) is in the range of 1:3.0 to 1:3.4.

9. A pipetting aid as in claim 1, wherein:

(m) said closure means (11) projects outwardly around and beyond the external periphery of said hollow cylinder (12), said pipetting aid further comprising:

(n) a groove (18) formed around the external periphery of said hollow cylinder (12) below that portion of said closure means (11) projecting beyond the external periphery of said hollow cylinder (12), (o) an inwardly projecting lip (9) formed around the internal periphery of said first tubular portion (3) and extending into said groove (18).

10. A pipetting aid as in claim 1, further comprising:

(m) a shoulder (14) on the external periphery of said hollow cylinder (12) adjacent the widest portion of said conical cross-section, said shoulder projecting outwardly from the external periphery of said hollow cylinder (12) and having an upper surface, wherein:

(n) the distance between said shoulder (14) and said groove (18) is such that when said lip (9) engages said groove (18), that part of ball-shaped portion (2) adjacent the vicinity of juncture thereof with said first tubular portion (3) rests on the said upper surface of said shoulder (14).

11. A pipetting aid as in claim 1, further comprising:

(m) an enlarged portion (10) formed in said second tubular portion (4) adjacent the juncture thereof with said third tubular portion (5), the volume of said enlarged portion (10) being less than the volume of said ball-shaped portion (2).

* * * * *